March 1, 1966 H. L. ERGOTT, JR 3,238,510

MEMORY ORGANIZATION FOR DATA PROCESSORS

Filed Dec. 29, 1961 5 Sheets-Sheet 1

INVENTOR.
HAROLD L. ERGOTT JR.
BY Paul D. Carmichael
ATTORNEY

March 1, 1966 H. L. ERGOTT, JR 3,238,510

MEMORY ORGANIZATION FOR DATA PROCESSORS

Filed Dec. 29, 1961 5 Sheets-Sheet 2

March 1, 1966 H. L. ERGOTT, JR 3,238,510

MEMORY ORGANIZATION FOR DATA PROCESSORS

Filed Dec. 29, 1961 5 Sheets-Sheet 5

United States Patent Office 3,238,510
Patented Mar. 1, 1966

3,238,510
MEMORY ORGANIZATION FOR DATA PROCESSORS

Harold L. Ergott, Jr., Apalachin, N.Y., assignor to International Business Machines Corporation, New York, N.Y., a corporation of New York Filed Dec. 29, 1961, Ser. No. 163,355
7 Claims. (Cl. 340—172.5)

The present invention relates generally to the computer arts and more particularly to an improved memory organization for data processors.

Digital computers are widely employed for processing data or information. A typical digital computer will comprise a memory for the storage of instruction and numerical data, arithmetic units for manipulating the data, timing circuits providing the necessary synchronizing signals, a plurality of input and output devices and a program control for regulating the operation of the other functional units in accordance with a program. All digital computers employ the same or equivalent functional units although the specific components thereof may vary. For example, the memory may comprise a core matrix, a matrix of ferrite apertured plates, a magnetic drum, electrostatic storage tubes, a semiconductor matrix, delay lines, etc. The memory organization of the present invention will be described in connection with a magnetic memory. However, it should be understood at the outset that the teachings of this invention are not limited to any particular type of memory.

When a data processor is of the binary type, the smallest discrete portion of the information or data is a "bit" which represents either of two stable states, usually referred to as the binary or logical one and zero. The bits are grouped to define "words." The memory of a computer has a plurality of storage positions and each position is adapted to receive and store a binary bit of information. The word locations within a memory are addressable and access to any particular word is provided by an instruction word. An instruction word usually comprises an operation portion (defining the operation to be performed by the computer) and an address portion (specifying the particular word location in the memory). The length or size of the basic instruction word is dependent upon the number and types of operations to be performed and the number of word locations in the memory to be addressed. In most prior art digital data processors, the length of the address portion of an instruction word is related in straight binary fashion to the number of words to be addressed. For example, if the address portion of an instruction word is formed from ten bits, the total number of memory locations which can be addressed according to this scheme is $2^{10}$ or 1024 words.

While this memory address technique is widely employed, the same is relatively expensive from a component and memory storage capability standpoint, especially when the memory is quite large. A flip-flop or other bistable storage device is required in the instruction register for each bit position of the address portion of an instruction word and the memory must be of sufficient size to accommodate the entire instruction word.

Various attempts have been made to reduce the number of bits required in the address portion of an instruction word for providing access to a given number of memory word locations. One approach to this problem is disclosed in copending application Serial No. 79,754, in the name of Thomas B. Lewis, filed December 30, 1960, entitled "Memory Addressing System," and which is assigned to the assignee of the present invention. The memory is divided into two or more separate and independent blocks and the address portion of the instruction word contains only enough bits to define the word locations within one of the blocks. Mutually exclusive gating means are provided for interconnecting one and only one of the memory blocks with the outputs of the instruction register at any one time. While this arrangement substantially reduces the number of bits required in addressing a given number of word locations or, conversely, allows an increase in the number of word locations addressable by the address portion of an instruction word having a fixed length, several restrictions are imposed on the user or programmer of the digital data processor. A minimum of one extra instruction is required each time a different memory block is operatively connected with the outputs of the instruction register. This has the effect of substantially increasing the size of the program. Further, to efficiently use such a digital data processor, the programmer must organize his program in such a manner that a long series of operations are completed solely within one block of the memory before it is required to switch to another block.

Briefly, the present invention relates to an improved memory organization for data processors wherein the memory is divided into a series of blocks or sectors which are separately and independently connectable with the outputs of an instruction register wherein a means is provided for interconnecting the various sectors and obtaining access to certain word locations regardless of which of the sectors is operatively connected with the outputs of the instruction register. A portion of the memory, hereinafter called the "residual memory" effectively overlaps and is associated with all of the sectors of the memory. The residual memory may be a separate and discrete physical area within the memory or a portion of at least one of the memory sectors. Means are provided for changing the effective size of the sectors and the residual memory in accordance with a preselected pattern. The residual memory can be a portion of predetermined word capacity of any of the memory sectors. The memory sectors and the residual memory can be subdivided upon the occurrence of certain control signals and this is particularly advantageous in completing certain bookkeeping or indexing operations. The apparatus is extremely versatile while requiring a minimum of components and special considerations on the part of the user or programmer.

It is the primary or ultimate object of this invention to provide an improved memory organization for data processors wherein the memory is divided into a plurality of sectors and a residual memory which contains word locations that can be addressed regardless of which of the memory sectors is operatively connected with the outputs of the instruction register. A program can be completed with a minimum of extra instructions for switching the various memory sectors since certain word locations are common to all of the sectors. The length and size of the address portion of an instruction word is substantially reduced.

Another object of the invention is to provide a memory organization for data processors wherein the sizes of the memory sectors and/or the residual memory may be changed as desired. A mask register is employed in one embodiment of the invention and the setting of the bistable storage devices within this register, in combination with associated gating circuitry, determines the number of words in the residual memory and the number of words in each of the bit sectors. The residual memory can be expanded or contracted as required to minimize the switching between memory sectors.

Yet another object of the invention is to provide a memory organization for data processors wherein the actual location of the residual memory, in addition to its capacity, can be changed from sector to sector. In a sense, the residual memory can be made to "float" from memory sector to memory sector.

A further object of this invention is to provide data processing apparatus of the character above described wherein each of the memory sectors and/or the residual memory can be divide and subdivided to define two or more subsectors within the same. A series of any number of words occurring at any successive word locations in the memory can be read out and circulated for indexing operations or the like.

Still a further object of the invention is to provide data processing apparatus of the type above described which is highly simplified in construction and operation. The length of the instruction word is substantially smaller than is normally required for addressing a memory of a given word capacity. The apparatus is extremely versatile and the programmer is not restricted in his use thereof.

The foregoing and other objects, features and advantages will be apparent from the following more particular description of preferred embodiments of the invention, as illustrated in the accompanying drawings.

In the drawings:

FIGURE 1 is a schematic block diagram of a portion of a digital data processor employing the memory organization of the present invention;

FIGURES 2*a* and 2*b* are detailed circuit diagrams showing particularly the various registers and gating circuitry used in the apparatus of FIGURE 1;

Figure 1:
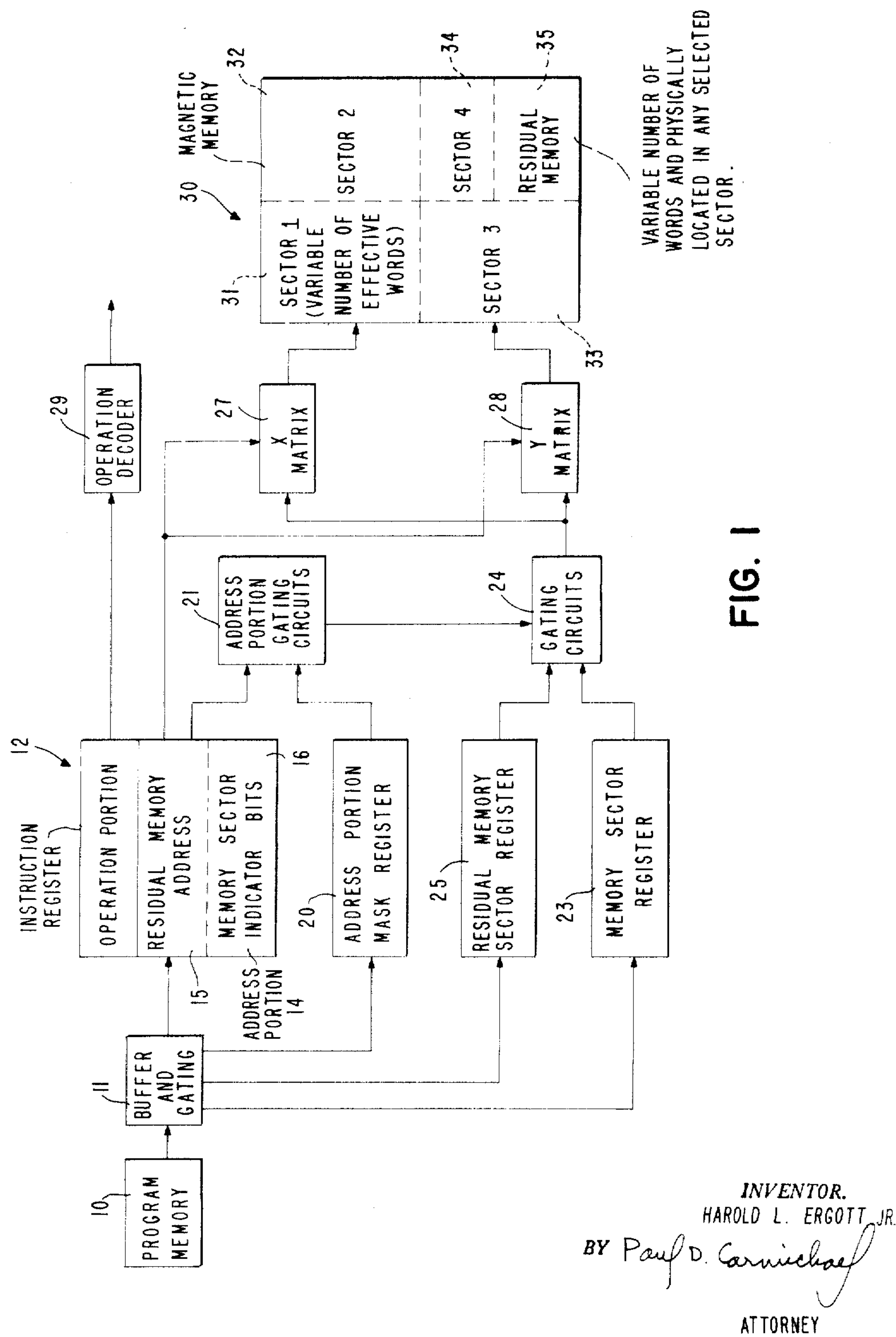

Referring now to the drawings and initially to FIGURE 1 thereof, there is shown a digital data processor employing the memory organization of the present invention. A program memory 10 is provided for storing a series of instruction words and other information quantities used in controlling the operation of the various components of the data processor. The instruction words and other information quantities are fed from the program memory in a successive manner to buffer and gating circuitry 11 which accomplishes several important functions. The buffer and gating circuitry samples the incoming signals supplied by the program memory 10 and converts them into substantially uniform pulses having a high degree of precision and also acts as a temporary storage means to assist in synchronizing the different components of the data processor. Further, this circuitry performs a gating function in routing the various instruction words and other information quantities to the correct registers. The principles of buffering and gating are well known in the art and for this reason this circuitry will not be further described.

The buffered instruction words are fed to an instruction register generally designated by the reference numeral 12. The instruction register comprises two main portions—an operation portion 13 and an address portion 14. The address portion 14 is further divided into a residual memory address 15 and memory sector indicator bits 16. This register may comprise a series of bistable storage devices with each of the devices associated with one bit of the instruction word.

Figures 2B, 4:
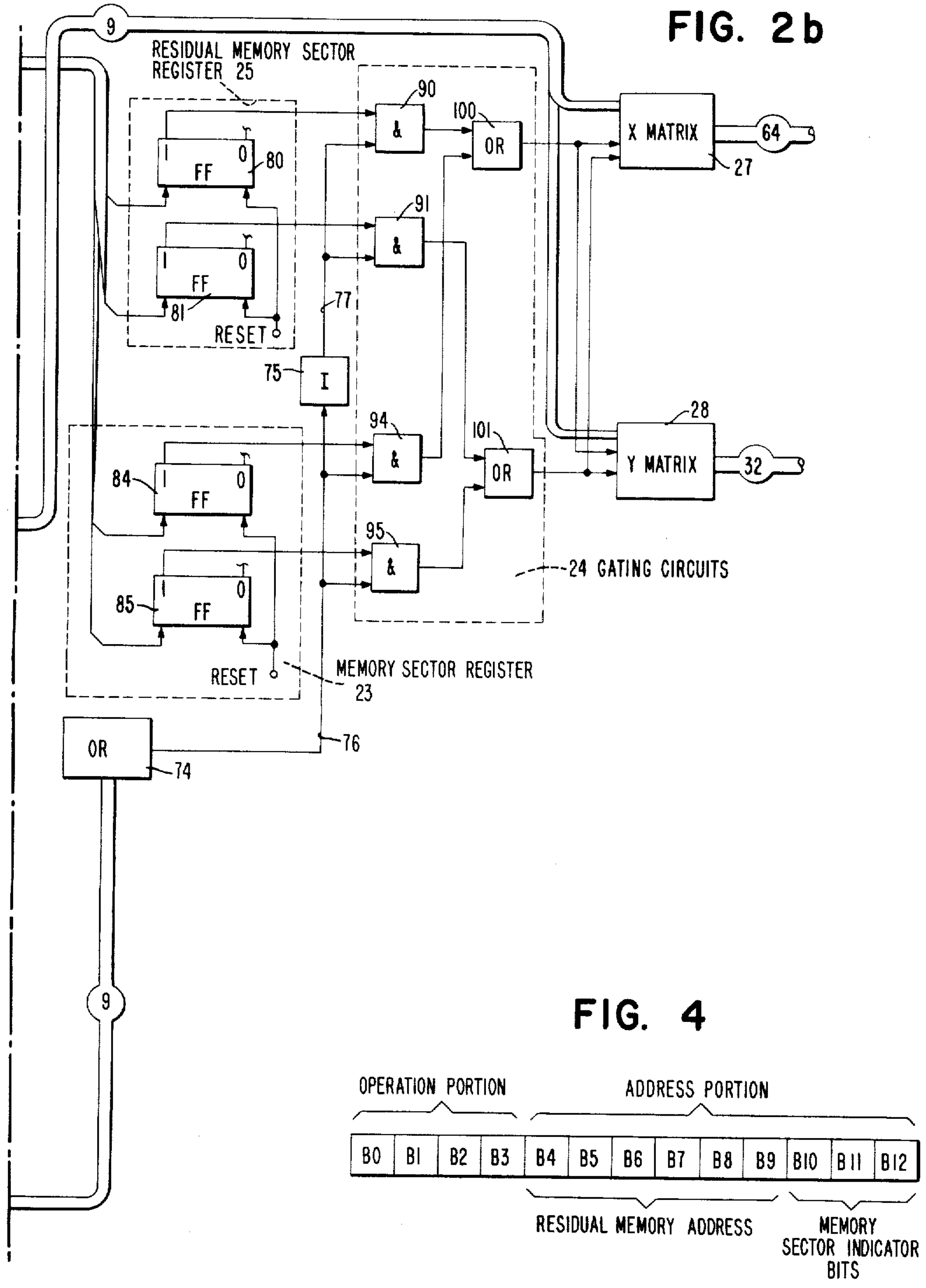
FIGURE 4 is a schematic illustration of the instruction word format for the data processor.

Before proceeding further with the description of the apparatus, the format of an instruction word employed in the data processor will now be examined. Referring now to FIGURE 4 of the drawings, a typical instruction word is shown to comprise thirteen bits designated by the reference indicia B0–B12. The first four bits, B0–B3, define the operation portion of the instruction word while the remaining bits (B4–B12) provide the address portion. It should be understood that the number of bits in the operation and address portions of the instruction word are selected in accordance with the requirements of the data processor. For example, the four bit operation code allows sixteen possible operational instructions ($2^4$). Additional bits would be included in the operation portion of the instruction word if it were necessary to have more than sixteen operational instructions.

The bits defining the address portion of the instruction word provide a residual memory address and a memory sector address. In the illustrated instruction word, the residual memory address comprises bits B4–B9 while the three highest order or significance bits B10–B12 define the memory sector address. Means are provided for changing the boundaries of the residual memory address and memory sector indicator bits within the address portion of an instruction word at any time during a processing operation. This redefining of the address portion of an instruction word during processing operations is highly advantageous in that the sizes or word capacities of the memory sectors and the residual memory can be expanded or contracted as desired.

The buffer and gating circuitry 11 also provides information quantities to an address portion mask register 20 which has a bit capacity equal to the number of bits in the address portion of an instruction word. The outputs of the address portion mask register 20 and the bistable storage devices associated with the address portion 14 of the instruction register 12 are combined in address portion gating circuits 21. In general, the mask register 20 and the address portion gating circuits 21 cooperate in providing the means for redefining the number and significance of the bits in the residual memory address and the memory sector address within the limitations of the size of the address portion of the instruction word. The number and significance of the bistable storage devices in the mask register 20 containing one of the binary representations will control the residual memory word capacity. As previously mentioned, the residual memory effectively overlaps and is common to all of the memory sectors. The residual memory can be addressed regardless of the memory sector which is selected at any instant in time.

A memory sector register 23 also receives input signals from the buffer and gating circuitry 11 and supplies outputs to gating circuits 24. The number of stages or bistable storage devices forming this register is related to the number of memory sectors within the memory. This register controls which of the memory sectors is operatively connected with the outputs of the address portion 14 of the instruction register 12.

In a similar manner, a residual memory sector register 25 is provided for controlling the memory sector in which the residual memory is located at any particular instant in a processing operation. Input signals are received from the buffer and gating circuitry 11 and output signals are transmitted to the gating circuits 24. The size or bit capacity of the residual memory sector register is sufficient to allow addressing of any memory sector where it is desirable to locate the residual memory during a processing operation.

The outputs of the gating circuits 21 and 24 and the address portion 14 of the instruction register 12 are supplied to units termed as X and Y matrices 27 and 28. These matrices have the function of translating the encoded address information provided by the operation portion of the instruction reigster and gating circuits 21 and 24 for addressing a magnetic memory generally indicated by the reference numeral 30 in FIGURE 1. The X and Y coordinate system is used since the word storage locations are defined with respect to a pair of perpendicular coordinates. By way of example, the memory may be of the type disclosed in U.S. Patent No. 2,988,732, in the name of Albert W. Vinal, filed October 30, 1958, and which is assigned to the assignee of the present invention. Briefly, this magnetic memory is of the ferrite apertured plate type consisting of a plurality of plates composed of a ferromagnetic material having a high degree of squareness ratio. The plates are provided with a plurality of openings arranged in a spaced grid-like configuration through which pass wires in a special arrangement for carrying selected currents that place different areas of the magnetic plates in a specific magnetic state and also for sensing pedetermined magnetic states set up within the plates. X and Y address drivers, not particularly shown, are provided for converting the address information into usable form for addressing the memory proper. The Z dimension of the memory or number of plates stacked in the vertical dimension defines the length of the words within the memory. For further details concerning this type of magnetic memory, reference should be made to the above-mentioned Vinal patent.

The magnetic memory 30 is divided into a number of sectors and each of these sectors has a word capacity approaching or equal to the number of word locations that can be addressed by the address portion of the instruction word. In the disclosed embodiment, the memory is partitioned into four memory sectors 31–34 and each sector comprises locations for the storage of 512 words. As previously noted, the address portion of the instruction word consists of nine bits and 512 unique combinations of binary signals are defined using these nine bits. Also depicted within the confines of the magnetic memory 30 is a residual memory 35. This residual memory is shown to be a portion of memory sector 34 but it can be physically located within any memory sector during a processing operation as controlled by the quantity in the residual memory sector register 25. The size of the residual memory can be varied depending upon the information quantity loaded into the mask register 20. It should be understood that any number of memory sectors can be employed, the word capacity of any memory sector can be as large as desired, the residual memory can be located in any memory sector and the size of the residual memory can be varied in accordance with a predetermined pattern throughout a processing operation.

The outputs of the bistable storage devices defining the operation portion 13 of the instruction register 12 are supplied to an operation decoder 29. The operation decoder conventionally comprises a series of logic blocks and the outputs thereof are transmitted to various portions of the processing apparatus for controlling the operation thereof. Such decoding circuits are well known in the art and the construction and operation thereof will not be further described.

Figure 2A:
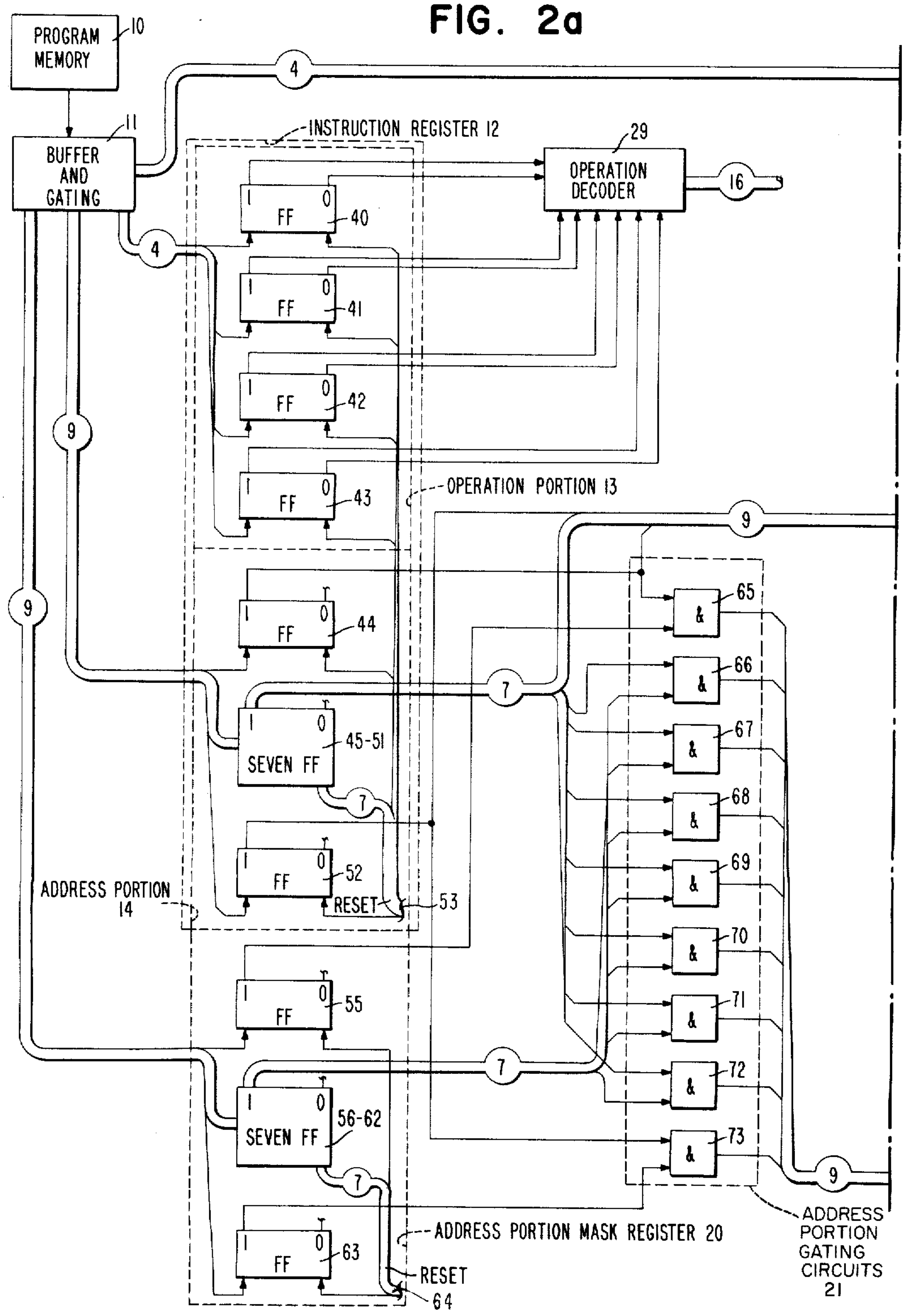

Referring now to FIGURES 2*a* and 2*b* of the drawings, the various registers 12, 20, 23 and 25 and the gating circuits 21 and 24 are illustrated in more detail. Throughout the following description and in the remaining figures of the drawings, there are certain conventions employed to designate the various logic elements. Bold face characters appearing within a block symbol for a logic circuit identify the common name of the circuit. The character & designates a logic block performing Boolean multiplication in that no output is evidenced unless and until signals are simultaneously present on each input thereof. The Or logic block is indicated by the symbol OR. This type of logic block performs Boolean addition whereby an output is present when a signal is supplied to any of the various inputs thereof. Inverters, which perform inversion and a powering or driving function, are represented by the character I.

The flip-flops FF are binary storage devices settable in either of two stable states. Each flip-flop has set and reset input conductors and corresponding output conductors. The set output conductor is represented by a one within the block adjacent this conductor and a zero similarly positioned designates the reset output conductors. When an input signal is applied to the set input conductor, the flip-flop is set in one of its stable states in accordance with the input signal. Further input signals of the same type applied to the set input conductor will not change the state of the flip-flop. An input signal applied to the reset conductor will cause the flip-flop to shift back to its initial state.

The instruction register 12 comprises thirteen flip-flops 40–52 whose set input conductors are responsive to electrical signals supplied from the buffer and gating circuitry 11. Each one of the flip-flops 40–52 corresponds to one bit of the instruction word which is shown in FIGURE 4 of the drawings. The reset input conductors of the flip-flops are interconnected whereby all of these devices can be reset at the same time upon the application of a pulse to reset terminal 53. The instruction register is reset to zero in the time interval between the application thereto of successive instruction words by timing pulses generated elsewhere in the data processing apparatus.

The output conductors of flip-flops 40–43 lead to the operation decoder 29 while the remaining nine flip-flops 44–52 define the address portion 14 of the instruction register. The set output conductors of flip-flops 44–52 are interconnected with the X and Y matrices 27 and 28 and the address portion gating circuits 21. As previously mentioned, the address portion of an instruction word designates not only the number of word locations which can be addressed in a memory sector but also the number of word locations within the residual memory.

The address portion mask register 20 is generally a mere image of the address portion of the instruction register 12 and comprises nine flip-flops 55–63 whose set input conductors receive input signals in parallel from the buffer and gating circuitry 11 and whose reset input conductors are connected to a common reset terminal 64. The set output conductors of the flip-flops 55–63 defining the mask register 20 are connected with address portion gating circuits 21.

The address portion gating circuits 21 include the nine And blocks 65–73 which each receive the output signals appearing on the set output conductors of the associated flip-flops in the address portion 14 of the instruction register 12 and the address portion mask register 20. For example, the set output signals from flip-flop 44 in the instruction register 12 and flip-flop 55 in the mask register 20 are combined in the And block 65. The And blocks 65–73 provide inputs to an Or logic block 74 which is in turn connected in series relation with an inverter 75. Output signals are taken over conductors 76 and 77 from the Or block 74 and inverter 75, respectively, and supplied to the gating circuits 24. The conductor 76 is at the positive voltage or binary one level only when binary ones are stored in at least one of the related pairs of flip-flops in the instruction register 12 and the mask register 20, and, as a consequence, one of the And blocks 65–73 is enabled.

The residual memory sector register 25 is provided by two flip-flops 80 and 81 which receive inputs in parallel from the buffer and gating circuitry 11. Similarly, the memory sector register 23 comprises flip-flops 84 and 85 whose states are controlled by signals supplied from buffer and gating circuitry 11. The set output conductors of the flip-flops 80–81 and 84–85 form the residual memory sector and memory sector registers, respectively, and are presented as inputs to the gating circuits 24.

The gating circuits 24 comprise a series of And blocks 90–91 and 94–95—one of which is associated with each of the flip-flops 80–81 and 84–85 of the residual memory sector register 25 and memory sector register 23. The And blocks 90 and 91, which are related to flip-flops 80–81 of the residual memory sector register 25, also receive the signal on conductor 77 leading from inverter 75. This same general arrangement exists between And blocks 94–95 and flip-flops 84–85 with the remaining inputs to these And blocks being supplied over conductor 76 leading from Or block 74. The outputs of And blocks 90 and 94 are combined in Or block 100. This same relationship exists between the outputs of the pair of And blocks 91 and 95 and the Or block 101. The conductors leading from Or blocks 100 and 102 are supplied to the X and Y matrices 27 and 28.

The X and Y matrices are essentially decoding networks which receive the nine binary inputs directly from flip-flops 44–52 of the instruction register and the two binary inputs from Or blocks 100 and 101 from the gating circuits 24. The memory 30 can be assumed as having 2048 addressable word locations (four sectors of 512 addressable word locations each) and this can be provided by a matrix of sixty-four address wires in one coordinate direction and thirty-two address wires in the other coordinate direction. The X and Y matrices 27 and 28 are operative to receive the above-identified binary input signals and provide 2048 unique output combinations on a total of 96 conductors (the sum of thirty-two and sixty-four).

Considering now the operation of the apparatus above described, it will be assumed that the various registers have been loaded with the following binary quantities supplied from the buffer and gating circuitry 11:

| Register: | Binary quantity |
|---|---|
| Instruction 12 | 1010000010111 |
| Address portion mask 20 | 000000111 |
| Residual memory sector 25 | 11 |
| Memory sector 23 | 01 |

In accordance with these assumed binary quantities, the flip-flops 80 and 81 in the residual memory sector register 25 are set in the one state which locates the residual memory in the fourth sector 34 of the magnetic memory 30. When the information quantities 00, 01 or 10 are stored in this register, the residual memory is provided in the first sector 31, second sector 32 or third sector 33, respectively.

The information quantity 01 in the memory sector register 23 operatively connects a portion of the second sector 32 with the instruction register 12. When the coded signals 00, 10 and 11 are stored in the flip-flops 84 and 85, the memory sectors 31, 33 and 34, respectively, are conditioned for interconnection with the instruction register 12. The quantities within the residual memory sector and memory sector registers are preferably infrequently changed during a data processing operation and the program is organized to minimize these changes. The address portion of the instruction register and the address mask portion register cooperate to define the effective number of words in the selected memory sector and the residual memory.

The first four bits (1010) of the instruction word control the operation to be performed by the data processor. For purposes of illustration, it will be assumed that this combination of binary ones and zeroes when applied to operation decoder 29 will cause the binary information stored at the word location specified in the address portion of the instruction word to be added to the binary quantity in the accumulator, not shown.

The binary quantity in the mask register 20, in combination with the address portion of the instruction word, determines the size and extent of the residual memory and the memory sector which can be addressed at any instant in time. If flip-flops 55–63 of the mask register each contain a binary zero, then the And blocks 65–73 will never be energized. The And blocks 94–95 cannot be enabled while the And blocks 90–91 can always be enabled depending, of course, on the information quantity stored in flip-flops 80–81. When the binary quantity 11 is stored in flip-flops 80–81, the And blocks 90–91 are energized whereby the residual memory is always located in the fourth sector 34 and comprises the entire sector (512 word locations). These word locations can be addressed regardless of the binary quantity in the memory sector address register 23 as long as the mask register 20 contains all zeroes. Effectively, the memory 30 appears as one residual memory of 512 word locations. The sector location of the residual memory is determined by the binary quantity in the residual memory sector register 25.

The other extreme condition is when the flip-flops 55–63 of mask register 20 all contain binary ones. At least one of the And blocks 65–73 will be enabled providing, of course, at least one binary one is contained in the address portion of the instruction word in the instruction counter. The Or block 74 will be energized and an output signal will appear on conductor 76. The And blocks 94–95 will be conditioned for energization in accordance with the binary quantity in the memory sector register 23. The remaining And blocks 90–91 of the gating circuits 24 cannot be enabled regardless of the binary quantity in the residual memory sector register 25. When information quantity 01 is stored in flip-flops 84–85 of the sector memory register 23, the And block 95 is enabled so that the 512 word locations in second memory sector 32 are addressable. The memory 30 appears as a single block of 512 locations positioned in memory.

If the mask register 20 is loaded with the assumed quantity (000000111), the And blocks 65–70 of address portion gating circuits 21 will not be energized. And blocks 71–73 are not energized unless flip-flops 50–52 contain a binary one. In the illustrated case (1010000010111), the flip-flops 50–52 of the instruction register 12 contain binary ones whereby And blocks 94–95 are conditioned for conduction. And block 95 is enabled since the quantity 01 is stored in the memory sector address register 23 and the second sector 32 of the the memory is operatively coupled with the outputs of the address portion 14 of the instruction register. The address portion (000010111) of the instruction word specifies a particular word location in the second sector 32.

Assuming the next instruction word supplied to the instruction register is 1010000000000, then the And blocks 90–91 of the gating circuits will be conditioned for energization. None of the And blocks 65–73 will be enabled since binary ones are not stored in any of the flip-flops 44–52. The residual memory 35 is now operatively connected with the outputs of the instruction register 12 and the word location specified in the address portion of the instruction word is addressed. The presence of a binary one in flip-flops 80 and 81 of the residual memory sector register 25 locates the residual memory 35 in the fourth sector 34 of the memory.

From the above discussion, it should be apparent that the quantity in the address portion mask register 20 determines the relative sizes of the sector and residual memories. For the illustrated case, the residual memory consists of 64 word locations which are addressable regardless of which of the sectors 31–34 is operatively connected with the outputs of the address portion of the instruction register. Similarly, each of the sectors will contain 448 addressable word locations with the quantity in the memory sector register 23 controlling which sector is addressable. The positioning of the residual memory within any selected sector is controlled by the quantity in the residual memory sector register 25.

Figure 3:
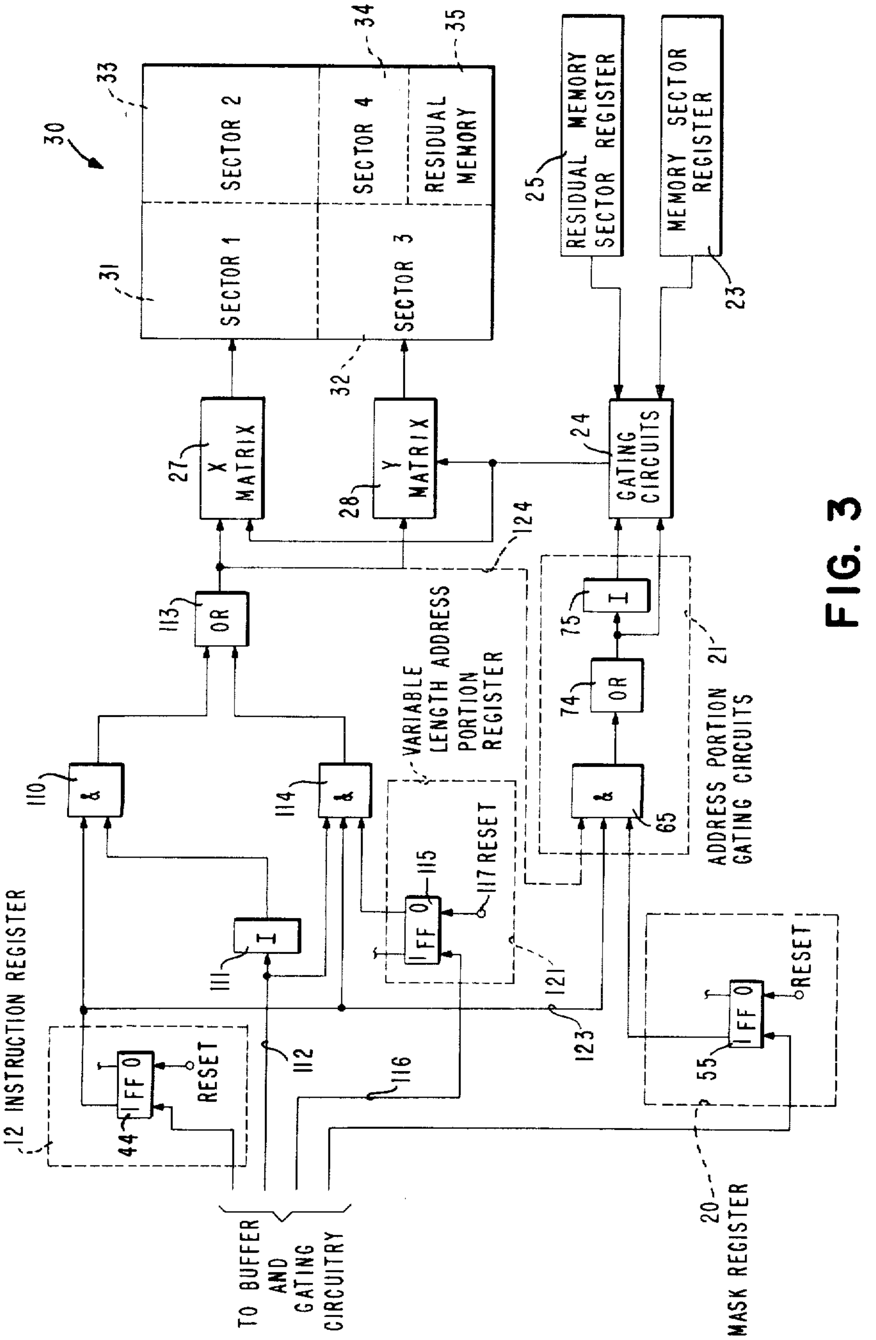
FIGURE 3 is a circuit diagram showing a modification to the apparatus of FIGURES 2*a* and 2*b* for subdividing the memory sectors and the residual memory.

As previously mentioned, means are provided for subdividing the memory sectors and/or the residual memory. An arrangement for this purpose is shown in FIGURE 3 of the drawings with respect to the associated flip-flops 44 and 55 of the address portion 14 of instruction register 12 and mask register 20, respectively. While only a portion of the apparatus disclosed in FIGURE 2 is shown in this figure, it will be apparent that similar circuitry can be employed with other associated pairs of the flip-flops in the instruction and mask registers.

In FIGURE 2 of the drawings, the set output conductors of the flip-flops 44–52 are directly connected with the X and Y matrices 27 and 28 whereby a word location specified in the address portion of an instruction word is immediately available from the operatively connected memory sector or residual memory. In this modification the set output conductor of flip-flop 44 defines one input to an And block 110. The other input to And block 110 is supplied by inverter 111 which is energized by the signal on control conductor 112. The control conductor 112 is connected with the buffer and gating circuitry 11 and is raised to the binary one level whenever it is desired to subdivide the memory sectors or the residual memory.

And block 110 drives an Or block 113 which in turn supplies control signals to the X and Y matrices 27 and 28. The other input to Or block 113 comes from And block 114 which combines the signals on control conductor 112, the set output conductor of flip-flop 44 and the reset output conductor of a flip-flop 115. The set input conductor of flip-flop 115 is connected via conductor 116 to buffer and gating circuitry 11 while the reset input conductor leads to a terminal 117. Reset terminal 117 is supplied with periodic positive pulses generated elsewhere in the data processing apparatus.

When the control conductor 112 is at the binary zero level, the And block 110 is conditioned for energization and the binary bit of information stored in flip-flop 44 is transmitted through Or block 113 to the matrices 27 and 28. And block 114 cannot be energized since the signal on control conductor 112 is at the binary zero level.

And block 114 will be enabled only when a binary one is stored in flip-flop 44, the signal on control conductor 112 is at the binary one level and the flip-flop 115 is reset. In this mode of operation the matrices 27 and 28 receive signals corresponding to the data stored in flip-flop 44 of the address portion of the instruction register. The And blocks 110 and 114 are effectively connected in parallel relation in such a manner that the matrices are responsive to the data in flip-flop 44 unless flip-flop 115 has been set and the signal on conductor 112 is at the positive or binary one level.

To decrease the effective size or to subdivide the operatively connected memory sector and/or residual memory, the signals on conductors 112 and 116 are raised to the binary one level under control of the program memory and the buffer and gating circuitry. And block 110 cannot be enabled since the input signal from inverter 111 is at the binary zero level. And block 114 is not energized as the reset output conductor of flip-flop 115 is at the binary zero level. The matrices 27 and 28 will be supplied with a binary zero under these conditions regardless of the data stored in flip-flop 44.

Each of the nine pairs of associated flip-flops in the instruction and mask registers (44–55, 45–56 . . . 52–63) may be provided with similar circuitry. The nine flip-flops 115 can be considered as a variable length address portion register 121 which is adapted to control the effective length of the address portion of the instruction register and to subdivide the various memory sectors and/or residual memory in accordance with a preselected pattern. For example, if the control conductor 112 is raised to the binary one voltage level and the binary quantity 000001111 is stored in flip-flops 115 of the variable address length portion register 121, the last four bits of an instruction word will have no effect. The And blocks 110 and 114 associated with flip-flops 49–52 of the instruction register cannot be enabled. The selected memory sector and/or residual memory (depending upon the information quantities stored in the mask register 20, residual memory sector register 25 and memory sector register 23) will comprise thirty-two ($2^5$) addressable word locations as long as these conditions exist. This type of operation is particularly advantageous when it is desired to index and/or update certain blocks of words in the memory. The appropriate instruction word—having an operation portion which specifies that consecutive words are to be read from the memory—along with the binary quantity for the variable length address portion register 121 and the binary one signal on control conductor 112 are supplied from the program memory and the buffer and gating circuitry. The size of the addressed memory sector and/or residual memory is limited to a small group of word locations which may be read out sequentially.

Considered from another point of view, the variable length address portion register 121 provides a means for changing the effective length of the address portion of an instruction word. In the above example, the address portion of the instruction word is limited to five bits. A particular instruction word will address a first word location when the flip-flops 115 are all reset or the signal control conductor 112 is at the binary zero level. This same instruction word may also address other word locations within the memory depending on the particular binary quantity stored in the variable length address portion 121. This may be particularly advantageous in connection with associative memories and in writing a program having a minimum of instruction words. To a certain extent, the memory organization of the present inveniton is self-organizing.

In the modification shown in FIGURE 3 of the drawings, one input to And block 65 of the address portion gating circuits 21 is supplied from the set output of flip-flop 44 over conductor 123. The operation of the mask register 20 and the address portion gating circuits 21 is independent of the data stored in the flip-flop 115 and the signal on control conductor 112. However, the conductor 123 may be replaced with a conductor indicated by the broken line 124 which interconnects the output of Or block 113 with the input of And block 65. As long as the control conductor 112 is at the binary one level and flip-flop 115 has been set, the output of Or block 113 will be at the binary zero level and And block 65 cannot be enabled regardless of the information quantities stored in the flip-flops 44 and 55. The arrangement is such that the variable length address portion register 21 controls not only the effective length of the address portion of an instruction word but also the effective length of the mask register 20. When the binary quantity 000001111 is stored in the flip-flops 115 of the variable length address portion register 21, the mask register 20 has an effective length of five bit positions since And blocks 70–73 cannot be energized. For the illustrated case, when only flip-flops 61–63 of the mask register contain a binary one, the residual memory sector register 25 is always connected with the X and Y matrices 27 and 28. The memory will appear as a residual memory of thirty-two word locations under these conditions.

The circuit elements 110–117 have been shown and described in connection with the output conductors of the address portion of the instruction register 12. However, it should be clearly understood that such circuit elements may be employed at other locations within the memory addressing system. For example, the same may be incorporated at the outputs of any or all of the bistable storage devices defining the mask register 20, the residual memory sector register 25 or the memory sector register 23.

Figure 5:
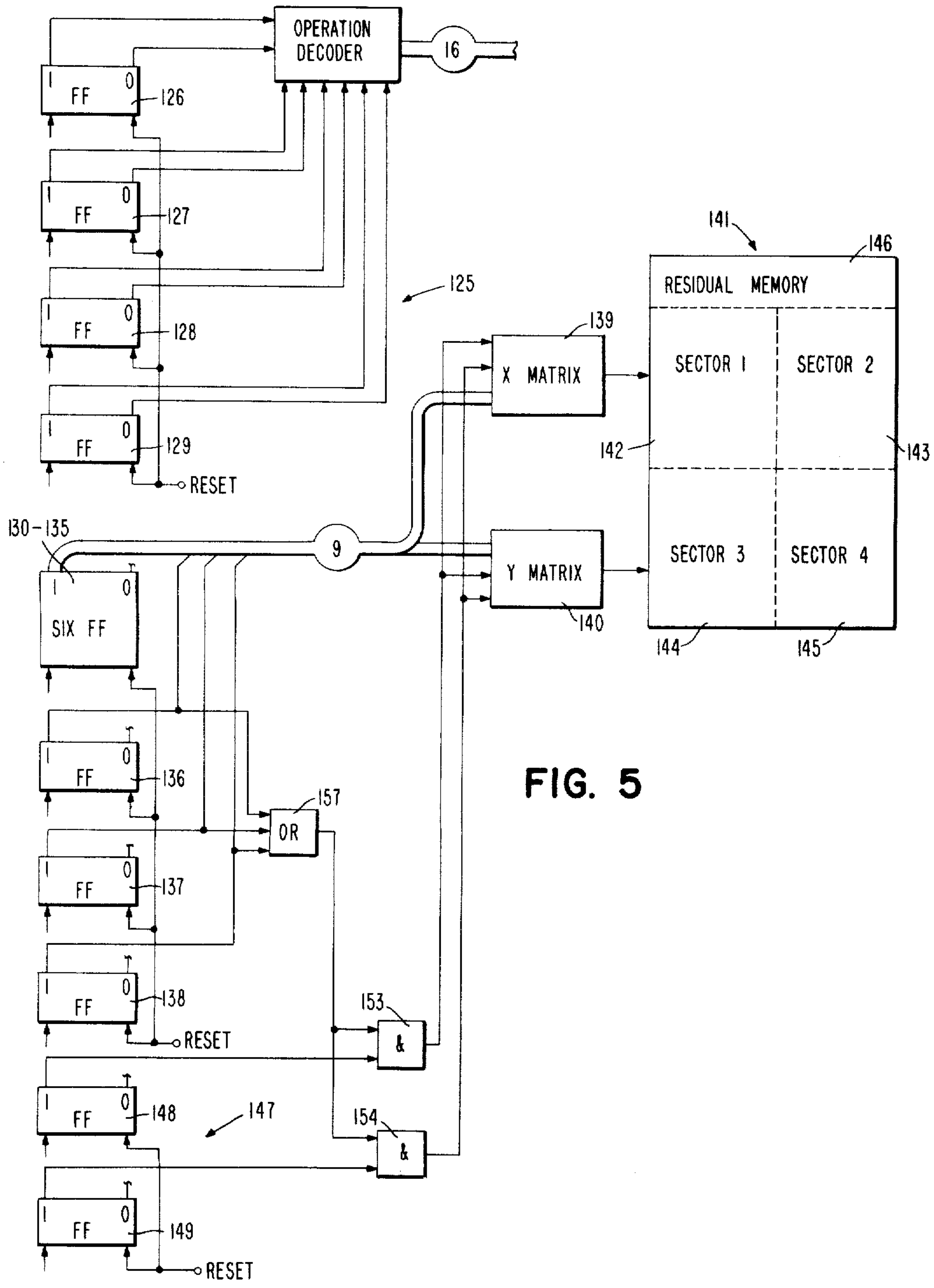
FIGURE 5 is a circuit diagram of a second embodiment of the invention.

Referring now to FIGURE 5 of the drawings, there is shown a portion of a digital data processor employing a second embodiment of the memory organization of the present invention. This apparatus comprises an instruction register 125 formed by thirteen flip-flops 126–138. The first four flip-flops 126–129 are associated with the operation portion of an instruction word while the remaining nine flip-flops 130–138 receive the address portion of an instruction word. The set output conductors of the flip-flops 130–138 are directly connected to X and Y matrices 139 and 140 associated with a magnetic memory 141. The magnetic memory 141 comprises four memory sectors 142–145 each having 448 addressable locations and a residual memory 146 having sixty-four addressable word locations.

A memory sector register 147 is provided by flip-flops 148–149. The set output conductors of these flip-flops supply inputs to And blocks 153–154, respectively. The other input to each of these And blocks is the output signal from Or block 157 which combines the set output signals of flip-flops 136–138 located in the address portion of the instruction register. The outputs from And blocks 153–154 are supplied to the X and Y matrices 139 and 140 and control which of the four memory sectors 142–145 is operatively connected with the outputs of the instruction register 125.

The Or block 157 provides a positive output signal whenever a binary one is stored in any of the three flip-flops 136–138 of the instruction register and this output signal conditions And blocks 153–154 for conduction. A memory sector will only be addressed when a binary one appears in at least one of the three most significant positions of the address portion of an instruction word. At all other times, a word location in residual memory 146 is addressed. The particular memory sector which is operatively connected with the outputs of the instruction register will depend upon the binary quantity stored in the memory sector register 147. For example, assuming flip-flop 149 is in its set state and flip-flop 148 is in its reset state, the second memory sector 142 will be addressed whenever a one is stored in any one of the flip-flops 136–138 and And block 154 is enabled.

The above-described memory organization is highly simplified but yet quite versatile in that the residual memory can be addressed regardless of which memory sector is addressed by the binary quantity in memory sector register 147. The word locations in the residual memory substantially reduce the overall length of bit size of the instruction word and minimize the number of times it is necessary to switch between memory sectors during a data processing operation.

One particular advantage of the present memory organization is the ease with which the size of the memory can be increased. Additional sectors of 448 word locations each are added by interconnecting the same with the X and Y matrices 139 and 140. The format of the instruction word always remains the same although additional bistable storage devices are required in the memory sector register 147. For example, sixteen memory sectors can be employed in connection with the embodiment shown in FIGURE 5 of the drawings with four bit positions in the memory sector register 147. The residual memory is, of course, addressable from each of the memory sectors whereby the overall memory system has many of the characteristics and advantages of a random access memory without requiring large instruction words. With sixteen memory sectors of 448 words and a residual memory of sixty-four words, a total of 7232 word locations are addressable. For optimum equipment utilization, the number of stages in the memory sector register register is binarily related to the number of memory sectors.

It should now be apparent that the objects initially set forth have been accomplished. A memory organization for data processors has been provided having a residual memory which overlaps and is addressable from any of the memory sectors. The apparatus is extremely versatile in that the word capacity of the memory sectors and/or the residual memory, the location of the residual memory and the effective length of the various binary information quantities can be changed in accordance with a preselected pattern throughout a data processing operation. Additional memory sectors can be added to a given memory organization with a minimum of modification. The overall memory has many of the characteristics of a random access type memory while yet the required bit positions in the instruction word are substantially reduced when compared with most prior art addressing systems. The memory organization is adapted to be used with either serial or parallel digital data processors. In the illustrated embodiments, the various binary quantities are shown as being stored in a program memory. These binary quantities may be stored within the main memory itself, if desired.

While the invention has been particularly shown and described with reference to preferred embodiments thereof, it will be understood by those skilled in the art that the forgoing and other changes in form and details may be made therein without departing from the spirit and scope of the invention.

What is claimed is:

1. A memory address system for data processing apparatus comprising:
- a first memory including a plurality of memory sectors each having a number of addressable data storage locations;
- a second residual memory having a number of addressable data storage locations;
- a source of information quantities;
- a first register having a plurality of stages for receiving information quantities from said source and temporarily storing the same;
- a second register having at least one stage for receiving information quantities from said source and temporarily storing the same;
- a circuit means interconnecting at least a portion of said stages of said first register with said second memory;
- gating means connecting the different second register with said memory sectors of the first memory;
- means actuating said gating means in response to the storage of selected information quantities in said first register to interconnect the information quantities in said second register with the one of said memory sectors specified by the information quantities in said second register; and
- said data storage locations in said second memory being addressable regardless of the information quantities in said second register.

2. Apparatus according to claim 1 wherein:
- said gating means comprises a plurality of And logic blocks, each associated with and receiving signals from a corresponding stage of said second register;
- said means actuating said gating means comprising an Or logic block receiving signals from certain of said stages in said first register; and
- said Or logic block providing an input signal to each of said And logic blocks.

3. Apparatus according to claim 1 comprising:
- a third register having at least one stage for receiving information quantities from said source and temporarily storing the same;
- second gating means connecting said third register with said memory sectors; and
- means actuating said second gating means in response to the storage of selected information quantities in said first register for connecting the third register with the one of said memory sectors specified by the information quantity in said third register at times other than when said first mentioned gating means is actuated.

4. A memory address system for data processing apparatus comprising:
- a memory having a plurality of addressable data storage locations;
- decoding means for receiving input signals and providing unique output signals in response thereto for addressing said data storage locations;
- a first source of a first series of control signals;
- a second source of a second series of control signals;

circuit means connecting said first series of control signals with said decoding means;

gating means connecting said second series of control signals and said decoding means; and means to actuate said gating means in response to selected combinations of certain of the control signals coming from said first source.

5. Apparatus according to claim 4 comprising:

a third source of a third series of control signals;

second gating means connecting said third series of control signals and said decoding means;

means to actuate said second gating means in response to selected combinations of certain other of the control signals coming from said first source at times other than when said first mentioned gating means is actuated;

a fourth source of a fourth series of control signals; and said means to actuate said first mentioned and said second gating means comprising means for combining the signals from said first and said fourth series in associated pairs.

6. Apparatus according to claim 5 wherein:

said means for combining comprises an And logic block for each pair of associated signals from said first and fourth sources;

Or logic means receiving the outputs of the And logic blocks;

the output of said Or logic means actuating one of said gating means;

an inverter receiving the output of said Or logic means; and the output of said inverter actuating the other of said gating means.

7. A memory address system for digital data processing apparatus, comprising:

a first magnetic memory including a plurality of individually selectable and addressable memory sectors having a plurality of data storage locations;

a second magnetic memory;

a source of control signals;

an instruction register operatively connected to receive the control signals from said source, said register including a first portion for temporarily retaining control signals to be stored in the first memory, and a second portion for retaining control signals to be stored in said second memory;

a memory sector register connected to said source for receiving coded combinations of signals representative of a selected one of said memory sectors in which the control signals in said first portion of the instruction register are to be stored;

a third register adapted to receive and retain other signals from the signal source;

address gating circuits connected to receive the signals stored in the first and second portions of the instruction register;

second gating circuits combiningly associated with the output of the address gating circuits and the third register;

X and Y matrices interrelating the second gating circuits with those addressed locations of the selected sector of the first memory; and direct interconnecting means relating the second portion of the instruction register and the matrices whereby certain information is selectively gated into the first memory and other information is directly entered into the second memory.

References Cited by the Examiner

UNITED STATES PATENTS 3,027,081 3/1962 Evans et al. ---------- 235—157

ROBERT C. BAILEY, *Primary Examiner.*

MALCOLM A. MORRISON, *Examiner.*